(12) United States Patent
Kunkel

(10) Patent No.: US 6,213,261 B1
(45) Date of Patent: Apr. 10, 2001

(54) HYDROPNEUMATIC SPRING

(75) Inventor: Ernst-Achim Kunkel, Röthlein (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/231,040

(22) Filed: Jan. 14, 1998

(30) Foreign Application Priority Data

Jan. 14, 1998 (DE) ............................................. 198 01 055

(51) Int. Cl.[7] ................................................. B60G 17/04
(52) U.S. Cl. ........................ 188/314; 188/284; 188/316; 267/127
(58) Field of Search ................................. 267/286, 284, 267/287, 316, 314, 217, 64.11, 64.16, 127

(56) References Cited

U.S. PATENT DOCUMENTS

| 4,819,770 | * | 4/1989 | Hahn | ................................. | 188/386 |
| 5,588,510 | * | 12/1996 | Wilke | ................................. | 188/314 |
| 5,971,117 | * | 10/1999 | Grundei et al. | ................................. | 188/284 |

FOREIGN PATENT DOCUMENTS

| 3902743 | * | 7/1990 | (DE) | ................................. | 188/316 |
| 0634298 | * | 1/1995 | (EP) . | | |

* cited by examiner

Primary Examiner—Matthew C. Graham
(74) Attorney, Agent, or Firm—Cohen, Pontani, Lieberman & Pavane

(57) ABSTRACT

A hydropneumatic spring, which is preferably articulately arranged between a vehicle body and a wheel guiding part in motor vehicles, has a fluid-filled cylinder which is entered by an outwardly sealed piston rod having a piston connected at the internal end. For altering spring force-deflection progressivity characteristic, a first working chamber of the cylinder is in constant hydraulic connection with a first spring energy store device and a second working chamber of the cylinder is in constant hydraulic connection with a second spring energy store device via a second valve device via a first valve device. In a mid spring deflection range, a second spring energy store device is connected via a second valve device and a bypass to the first spring energy store device. The bypass includes an axially extending channel arranged between the first working chamber and the second working chamber. The first and second working spaces are disconnected when the piston is not in the mid-deflection range and the channel does not bypass around the outer surface of the piston.

9 Claims, 4 Drawing Sheets

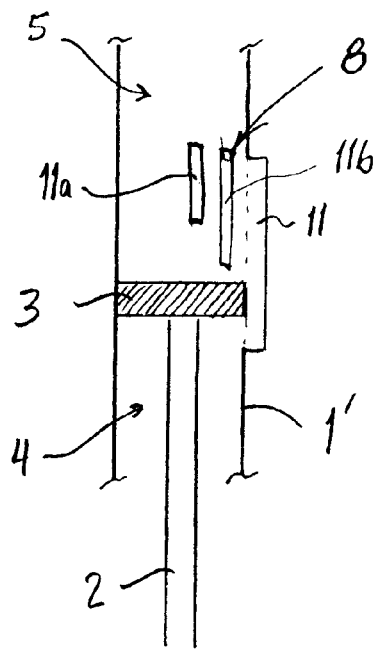
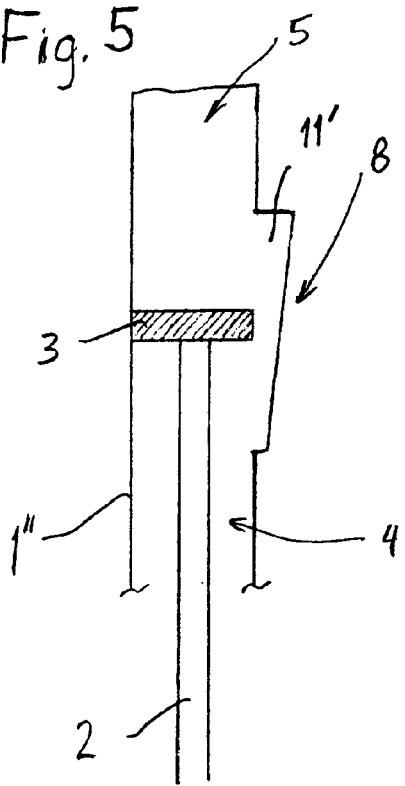

HYDROPNEUMATIC SPRING

BACKGROUND OF THE INVENTION

1. Field of the Invention

The invention relates to a hydropneumatic spring, which is preferably arranged between a vehicle body and a wheel guiding part in a motor vehicle, having a fluid-filled cylinder which is entered by an outwardly sealed piston rod connected to a piston which divides the cylinder into first and second working chambers, the first working chamber of the cylinder being in hydraulic connection with a first spring energy store via a valve device for altering the force-deflection progressivity characteristic of the spring (rate of change in the spring force as the spring is deflected), the second working chamber of the cylinder being in hydraulic connection with a second spring energy store, and a bypass connecting the first working chamber to the second working chamber when the hydropneumatic spring is in a mid deflection range.

2. Description of the Related Art

A prior art hydropneumatic spring having two spring energy stores is known from European reference EP 0 634 298 A1. In a spring cylinder, a piston rod is guided over a large portion in an axially movable manner and is sealed outwardly and with respect to a working chamber. The piston rod has a stop plate but does not have a piston. The portion of the piston rod with the stop plate enters the working chamber which is hydraulically connected to a spring energy store via a valve device. When the piston rod is in the mid-spring deflection range, an annular groove provided on the piston rod is connected to the working chamber via a bypass arranged in the piston rod, while a second spring energy store, between the seals, opens out into the piston rod guide. In the mid spring deflection range, the hydraulic connection between the two spring energy stores takes place via the annular groove and the bypass. Therefore, the force-deflection progressivity characteristic of the spring (rate of change of the spring force as a function of the amount of deflection) is consequently less or flatter in the mid spring deflection range. The complex structural design of this prior art spring cylinder entails high costs for the components and high costs for their assembly. In particular, in the spring range in which the second spring energy store is shut off from the annular groove, the pressure of the spring energy store has the effect of exerting a transverse force on the piston rod, which brings about an undesired increase in the frictional force during the axial movement of the piston rod.

SUMMARY OF THE INVENTION

The object of the present invention is to provide a hydropneumatic spring which has a structurally simple, deflection-dependent alteration of the force-deflection progressivity characteristic of the spring, high functional reliability with low friction and low costs in production and assembly.

This object is achieved according to the invention by a piston cylinder unit having a cylinder and a piston connected at an end of a piston rod dividing the cylinder into a first working chamber on the piston rod side of the piston and a second working chamber on the other side of the piston with a bypass being arranged between the first and second working chambers having at least one channel which extends in the axial direction and can be controlled by the outside surface of a piston solidly connected to the piston rod such that the first working chamber and the second working chamber are connected by the bypass when the piston is within a mid-deflection position range. A first spring energy store is in constant operative connection with the first working chamber on the piston rod side and a second spring energy store is in constant operative connection with the second working chamber, via a valve device in each case. The trouble-free connection of the first and second spring energy stores to the first and second working chambers and the deflection-dependently controllable bypass between the first and second working chambers make it possible in a simple way to provide a hydropneumatic spring whose overall spring deflection is subdivided into a plurality of spring deflection ranges with different spring force-deflection rates or progressivities in each of the ranges. The mid spring deflection range, in which the first and second working chambers and consequently the first and second spring energy stores are hydraulically connected to one another by the bypass, has a flat force-deflection progressivity characteristic. The adjoining spring deflection ranges have much steeper force-deflection progressivity characteristic. High functional reliability, in comparison with the prior art reference EP 0 634 298 A1, with low friction of the mutually movable components is obtained, since the piston supported on the inside wall of the cylinder forms the second guide for the piston rod and no radial forces are exerted on the piston rod by the spring energy stores in any spring deflection range.

In one embodiment, according to the invention, the first spring energy store communicates via a valve device and a connection arranged in the cylinder, directly into the first working chamber on the piston rod side, while the second spring energy store is hydraulically connected via the valve device, via a further connection in the cylinder, to the second working chamber remote from the piston rod. The connections of the first and second energy stores are in this case preferably arranged on the cylinder such that they are not covered by the piston. In addition, a pulling stop may, for example, be provided on the piston rod to prevent the piston from reaching the position of the known connection parts may which even protrude slightly into the respective working chamber. Special machining of the inside surface of the cylinder after fitting the connections to the first and second spring energy stores is consequently no longer required.

In another embodiment, as the invention shows, the second spring energy store is hydraulically connected to the second working chamber remote from the cylinder via the valve device and a longitudinal channel arranged in the piston rod. The longitudinal channel is preferably formed by a tubular piston rod. The first spring energy store opens out via the valve device into the first working chamber of the cylinder on the piston rod side as described in the first embodiment. In this way, particularly when the hydropneumatic spring is fitted with an upward extending piston rod, a connection of the second spring energy store is required to take up only the slight movements of the connection joint and may be of a corresponding simple configuration.

This also applies to a further embodiment which is formed by the second spring energy store communicating via the valve device and a connection in the cylinder into the second working chamber while the first spring energy store is hydraulically connected to the first working chamber on the piston rod side via the valve device and a longitudinal bore which is arranged in the piston rod and in which a transverse opening is located proximate the piston between the longitudinal bore and the first working chamber.

In a further embodiment, a very simple and low-cost configuration for the bypass is created by a channel which runs in the longitudinal direction of the cylinder designed such that it is open toward the piston over its entire length and has a varying cross section along the axial direction. This channel may, according to the invention, be formed by a plurality of grooves made in the cylinder. The channel may also have a plurality of longitudinal grooves provided with different lengths, which are arranged in the same position or different positions within the length of the cylinder tube.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 4 shows an embodiment of a cylinder of the hydropneumatic spring shown in FIG. 1 having a plurality of longitudinal grooves; and FIG. 5 shows another embodiment of a cylinder of a hydropneumatic spring shown in FIG. 1 having a channel with a variable cross section along the axial direction.

DETAILED DESCRIPTION OF THE PRESENTLY PREFERRED EMBODIMENTS

Figure 1:
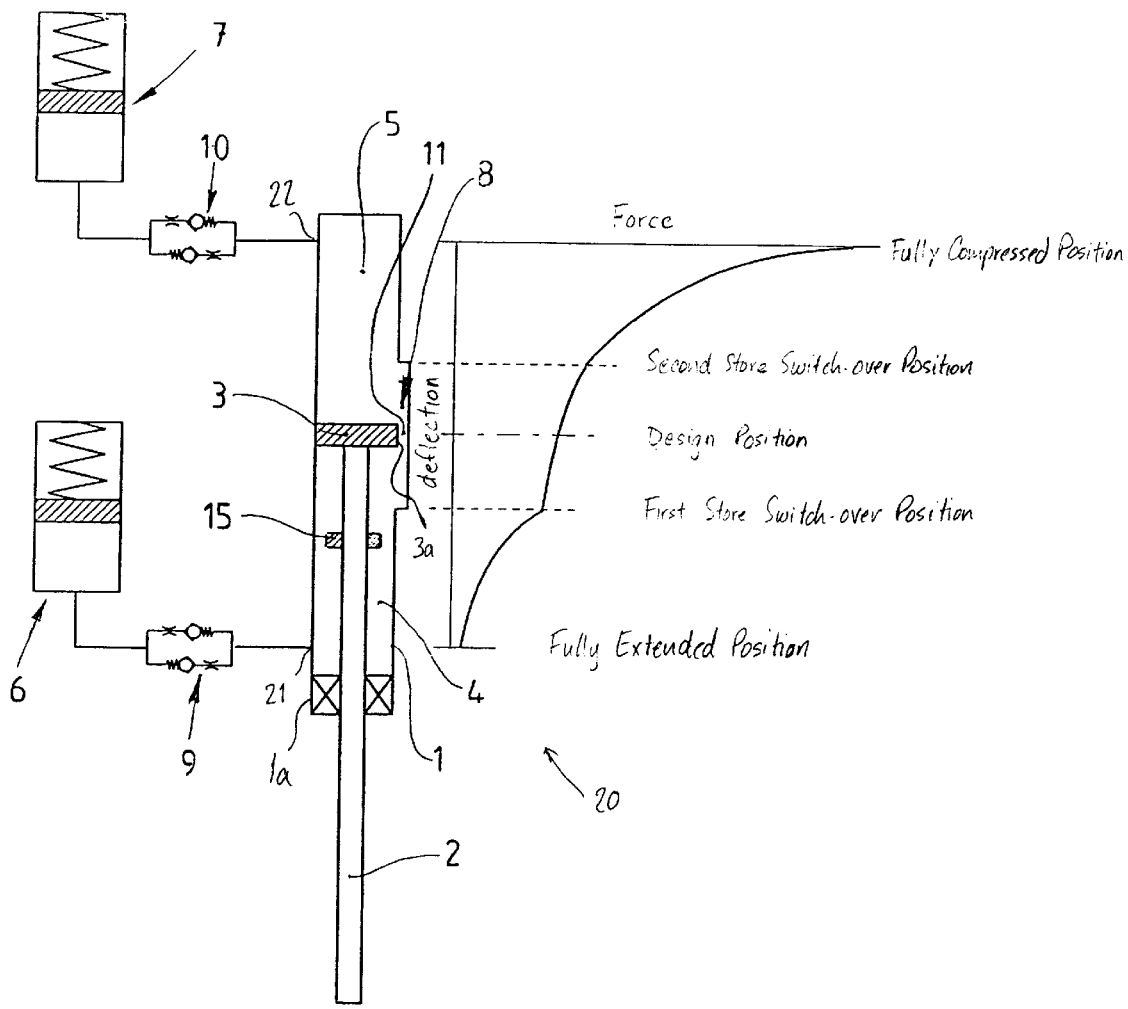
FIG. 1 is a schematic diagram showing a hydropneumatic spring according to an embodiment of the invention in longitudinal section, with an associated spring force diagram.

In a preferred embodiment, a hydropneumatic spring 20 shown in FIG. 1 is installed as a shock absorber in an articulated manner between a vehicle body and a wheel guiding part of a motor vehicle. However, the hydropneumatic spring 20 may be used with any device requiring a spring having deflection adjustable rates of change in spring force.

The hydropneumatic spring 20 has a cylinder 1 which is filled with a hydraulic fluid. An outwardly sealed piston rod 2 enters one end of the cylinder 1 through a piston rod guide 1a. The piston rod 2 is connected to a piston 3 that is guided in an axially movable manner in the cylinder 1. The interior space of the cylinder 1 is subdivided by the piston 3 into a first working chamber 4 on the piston rod side and a second working chamber 5 remote from the piston rod. A first spring energy store 6 is hydraulically connected via a valve device 9 and a connection 21 arranged in the cylinder 1 to the first working chamber 4 and a second spring energy store 7 opens out via a valve device 10 and a connection 22 arranged in the cylinder 1 to the second working chamber 5. Each valve device 9, 10 has a valve unit, comprising a nonreturn valve and usually a damping valve, for conducting the flow of the hydraulic fluid into the spring energy store 6, 7 and a valve unit for conducting the flow of the hydraulic fluid out of the spring energy store 6, 7.

The piston 3 is depicted at a position in a mid spring deflection range, the so-called "design position", in which a bypass 8 formed by an open channel 11 is effective and the working chambers 4 and 5 are hydraulically connected to each other through the open channel 11 around an outer surface 3a of the piston 3, so that there is pressure equalization between the working chambers 4 and 5. A pushing out force acts on the piston rod 2 which corresponds to the pressure multiplied by the cross-sectional area of the piston rod. If the damping forces are ignored, the pressure in the working chambers 4 and 5 and in the spring energy stores 6 and 7 alters in a way corresponding to the piston rod volume entering or leaving the cylinder 1 in the entire displacement range of the piston rod in which the bypass 8 is effective. Accordingly, a flat force-deflection progressivity characteristic (rate of change of the spring force as a function of the amount of deflection, i.e., the slope of the force-deflection graph in FIG. 1) is obtained in the mid spring deflection range, which extends from a first store switch-over position to a second store switch-over position.

If the open channel 11 forming the bypass 8 is shut off by the piston 3 passing one of the first and second store switch-over positions, such as when the piston rod 2 is pushed further into the cylinder 1, the two spring energy stores 6 and 7 are hydraulically separated and a store switch-over occurs. When the piston 3 is pushed further into the cylinder and passes the second store switch-over position, the pressure in the second spring energy store 7 increases and the pressure in the first spring energy store 6 decreases as the piston rod 2 enters further into the cylinder 1, thereby producing a steep force-deflection progressivity characteristic between the second store switch-over position and the fully compressed position.

When the piston rod 2 is moved out of the cylinder 1 and the piston 3 reaches the first store switch-over position, the bypass 8 is shut off and the pressure equalization between the first and second working chambers 4 and 5 is also shut off. At the first store switch-over position, before the piston 3 is moved further out of the cylinder, the pressure in the first and second working chambers is equal. However, a pushing out force acts on the piston because the effective cross-sectional area of the piston 3 facing the first working chamber 4 is less than the cross-sectional area of the piston facing the second working chamber 5 by the cross-sectional area of piston rod 2. As the piston 3 is moved further past the first store switch-over position by the piston rod 2 provided with a pulling stop 5, the pressure in the first working chamber 4 and consequently also in the first spring energy store 6 increases. On the other hand, the pressure in the second working chamber 5 and in the second spring energy store 7 connected to it decreases such that the effective pushing-out force exerted on the piston 3 and piston rod 2 decreases until, for example, as a result of the pulling stop 5 bearing against the inner end face of the piston rod guide, the fully extended position is reached. The force-deflection progressivity characteristic for the hydropneumatic spring 20 is much steeper between the first store switchover position and the fully extended position than the spring-deflection progressivity characteristic in the region of the effective bypass cross section 8, as the characteristic curve on the force-deflection graph depicted to the right of the hydropneumatic spring 20 in FIG. 1 shows.

Figure 2:
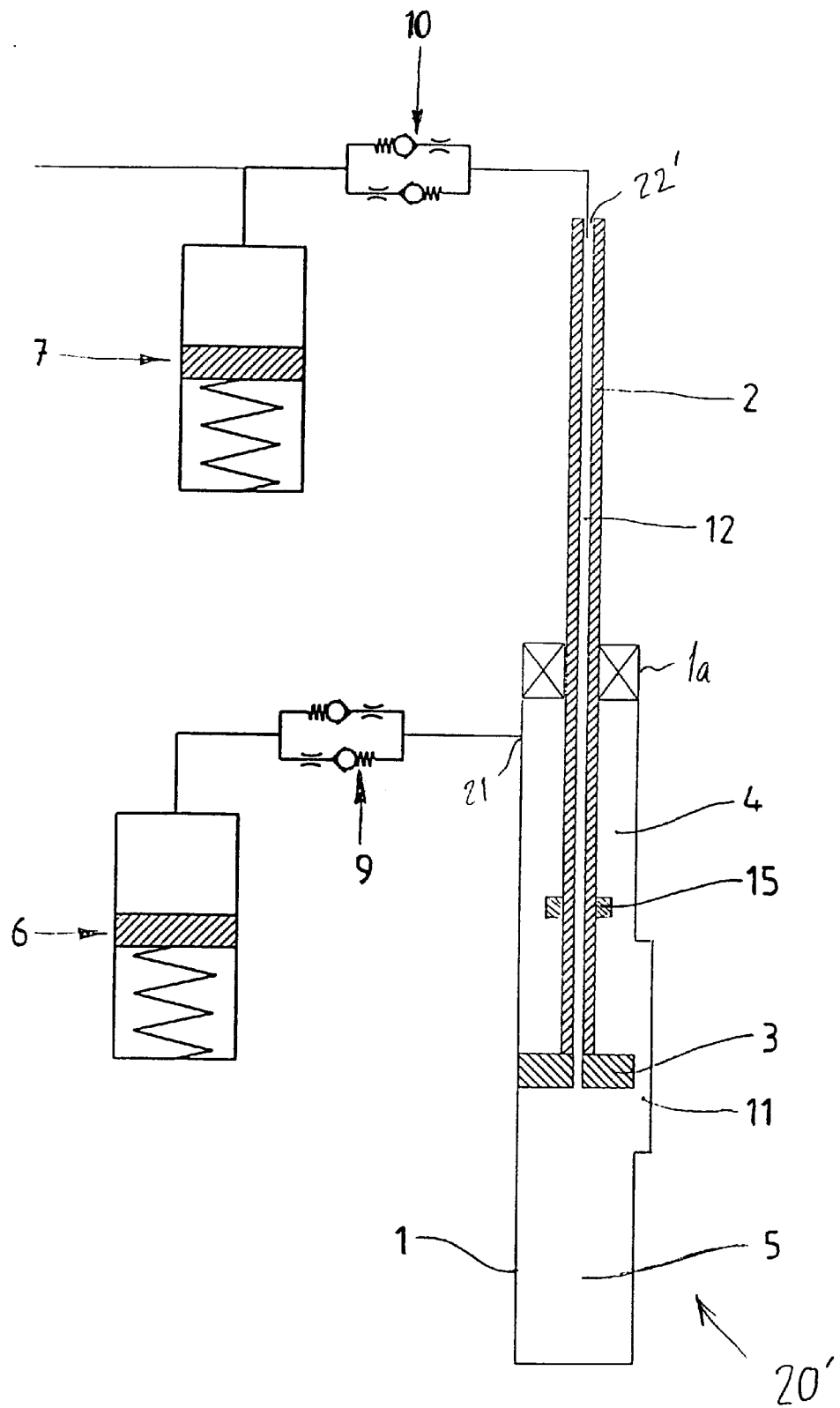
FIG. 2 is a schematic diagram showing another embodiment of the hydropneumatic spring, in which a spring energy store is connected via the piston rod to the working chamber remote from the piston rod.

FIG. 2 shows another embodiment of a hydropneumatic spring 20' according to the present invention having a piston rod 2 which passes through a top of the cylinder 1 and has a longitudinal channel 12 that also passes through the piston 3 and opens out into the second working chamber 5 on the side of the piston 3 that is remote from the piston rod 2. A connection 22' fastened on the end of the piston rod 2 that is external to the cylinder 1 connects the longitudinal channel 12 via the valve device 10 to the spring energy store 7, so that a hydraulic connection is produced between the spring energy store 7 and the second working chamber 5. The first working chamber 4 is hydraulically connected to the spring energy store 6 at connection 21 proximate the piston rod guide via the valve device 9. The piston 3 controls the channel 11 located in the cylinder 1 which is open toward the piston 3. The mode of operation of this embodiment corresponds to that according to FIG. 1.

Figure 3:
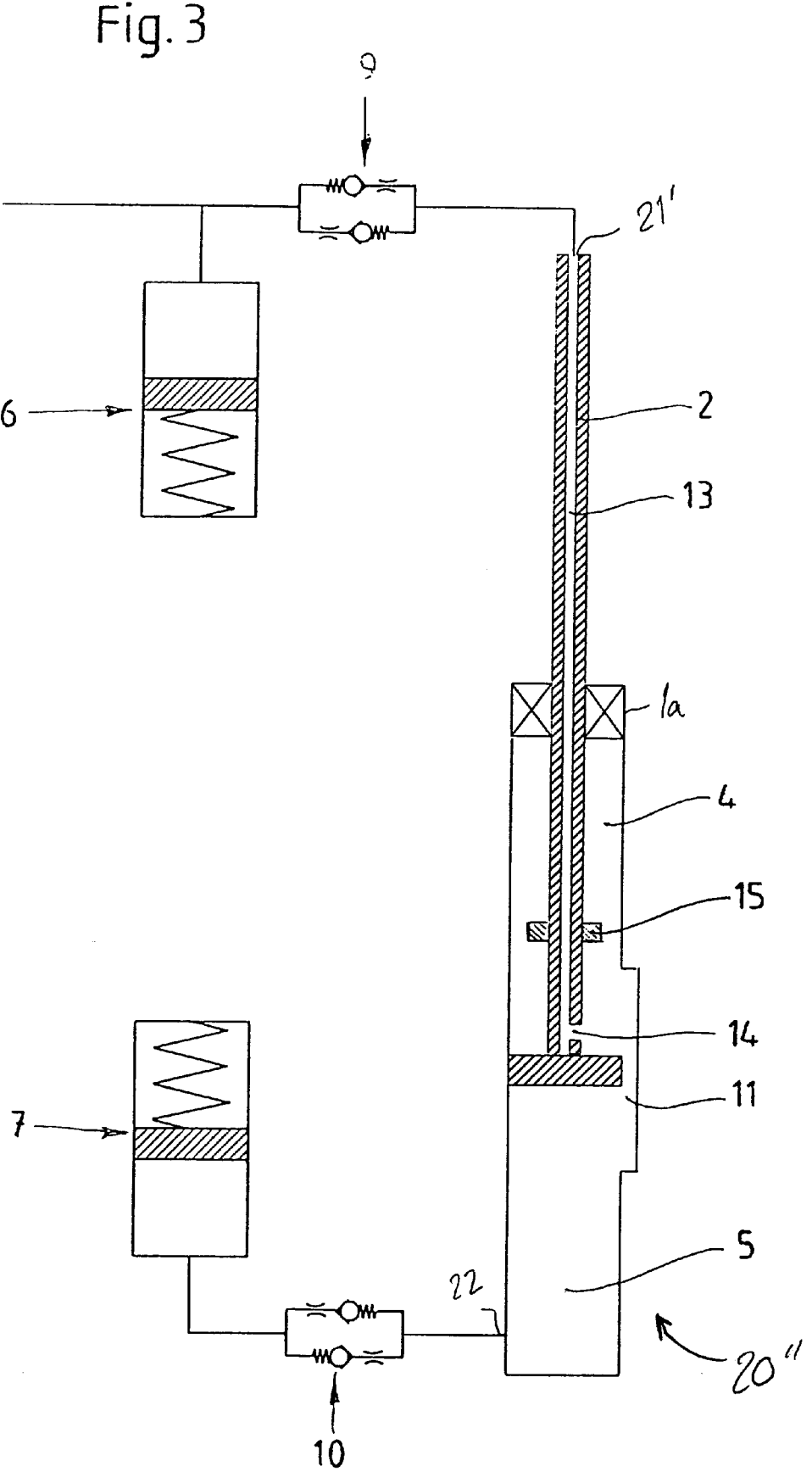
FIG. 3 is a schematic diagram showing a further embodiment of the hydropneumatic spring in which a spring energy store is connected via the piston rod to the working chamber on the piston rod side.

A hydropneumatic spring 20" according to FIG. 3 comprises a spring energy store 6 connected via the valve device 9 and connection 21' to a longitudinal bore 13 through the piston rod 2. The longitudinal bore 13 communicates with the first working chamber 4 via a transverse opening 14 in the piston rod 2 which opens to the first working chamber 4 proximate the piston rod side of the piston 3. The spring energy store 7 is connected by the associated valve device 10 and connection 22 on the cylinder 1 to the second working chamber 5. In this embodiment, the mode of operation corresponds to that according to FIG. 1.

The longitudinal channel 12, or the longitudinal bore 13, shown respectively in FIGS. 2 and 3 in the piston rod 2 is usually formed by a piston rod produced from a tube. The open channel 11 of the cylinder 1, which is present in all three embodiments, may comprise many variations. For example, the channel 11 may comprise one or more channels comprising longitudinal grooves made in the cylinder 1. In FIG. 4, the cylinder 1' has three channels 11, 11a, 11b. Each of the channels 11, 11a, and 11b has a different axial length. The shorter channels 11a and 11b are positioned closer to the second working chamber 5 but they may also be positioned closer to the first working chamber 4, if required. Although FIG. 4 shows three channels any number of channels can be used.

In another embodiment, the channel 11 of the bypass 8 may have a varying cross section such that it is open in the end regions of the bypass 8 only. In another embodiment, the channel 11 may have a varying cross section along the axial length as shown in FIG. 5. In FIG. 5 the cross section changes at a constant rate from one axial end of the channel to the other. However, this is not required and any variation in cross section may be used, as required. The portion of the channel closest to the second working chamber 5 has a larger cross section in FIG. 5. However, the larger cross section of the channel 11 may also be located closer to the first working chamber 4 if required.

Furthermore, the first and second spring energy stores 6 and 7 may comprise cylinders having a separating piston and may have a mechanical spring and/or a pressurized gas filling. The first and second spring energy stores 6 and 7 may also comprise diaphragm stores. Great freedom with respect to the configuration of the spring energy stores is possible. The variability of the types of parts which may be used also applies similarly to the valve devices 9 and 10 which may be used. The non return valves of these valve devices may be combined with damping valves, making it possible in a simple way to adapt the hydropneumatic spring 20, 20', 20" according to the invention to required damping forces with respect to the damping effect.

The invention is not limited by the embodiments described above which are presented as examples only but can be modified in various ways within the scope of protection defined by the appended patent claims.

I claim:

1. A hydropneumatic spring, comprising:

a fluid filled cylinder having a first end and a second end;

a piston rod having a first piston rod end guidably inserted in said cylinder through said first end of said cylinder;

a piston having an outer surface and connected to said first piston rod end of said piston rod and axially movably mounted in said cylinder for axial movement with said piston rod in said cylinder, said piston dividing said cylinder into a first working space between said piston and said first end of said cylinder and a second working space between said piston and said second end of said cylinder;

a first spring energy store device hydraulically connected to said second working space via a first valve device for altering a force-deflection progressivity chartacteristic of said hydropneumatic spring;

a second spring energy store device hydraulically connected to said second working space via a second valve device for altering a force-deflection progressivity chartacteristic of said hydropneumatic spring; and a bypass comprising a channel arranged in a bypass area axially extending between a first store switchover position and a second store switch-over position, said channel being operatively arranged in said cylinder for hydraulically connecting said first working space with said second working space when said piston is positioned in said bypass area between said first store switch-over position and said second store switch-over position, wherein said first working space and said second working space are hydraulically separated such that said first working space is connected solely to said first spring energy store device and said second working space is connected solely to said second spring energy store device when said piston is positioned outside of said bypass area.

2. The hydropneumatic spring of claim 1, wherein said first spring energy store device is hydraulically connected to said first working space by a first connection through said cylinder directly into said first working chamber, and said second spring energy store device is hydraulically connected to said second working space by a second connection through said cylinder directly into said second working space.

3. The hydropneumatic spring of claim 1, wherein said piston rod comprises a longitudinal channel in hydraulic communication with said second working space;

said first spring energy store device being hydraulically connected to said first working space by a first connection through said cylinder directly into said first working chamber; and said second spring energy store device being hydraulically connected to said second working space through said longitudinal channel via a second connection hydraulically connected to said longitudinal channel.

4. The hydropneumatic spring of claim 1, wherein said piston rod comprises a longitudinal channel in hydraulic communication with said first working space through a transverse opening in said piston rod proximate said piston;

said first spring energy store device being hydraulically connected to said first working space through said longitudinal channel via a first connection hydraulically connected to said longitudinal channel; and said second spring energy store device is hydraulically connected to said second working space by a second connection through said cylinder directly into said second working chamber.

5. The hydropneumatic spring of claim 1, wherein said channel is open toward said piston over an entire axial length between said first store switch-over position and said second store switch-over position and comprises a varying cross section along the axial direction.

6. The hydropneumatic spring of claim 1, wherein said channel comprises a longitudinal groove in said cylinder.

7. The hydropneumatic spring of claim 6, wherein said longitudinal groove comprises a variable cross section along an axial length of said longitudinal groove.

8. The hydropneumatic spring of claim 1, wherein said channel comprises a plurality of longitudinal grooves and at least one of said plural longitudinal grooves has an axial length different from another of said plural longitudinal grooves.

9. The hydropneumatic spring of claim 1, wherein said channel hydraulically connects said first working space to said second working space around said outer surface of said piston when said piston is positioned between said first store switchover position and said second store switch-over position.

* * * * *

UNITED STATES PATENT AND TRADEMARK OFFICE
CERTIFICATE OF CORRECTION

PATENT NO. : 6,213,261 B1
DATED : April 10, 2001
INVENTOR(S) : Ernst-Achim Kunkel It is certified that error appears in the above-identified patent and that said Letters Patent is hereby corrected as shown below:

The filing date of the application is January 14, 1999.

Signed and Sealed this

Twenty-seventh Day of November, 2001

Attest:

NICHOLAS P. GODICI
Attesting Officer  Acting Director of the United States Patent and Trademark Office